United States Patent
Burlee et al.

(10) Patent No.: US 9,797,253 B2
(45) Date of Patent: Oct. 24, 2017

(54) SYSTEM AND METHOD FOR REPAIRING BLADES

(71) Applicant: General Electric Company, Schenectady, NY (US)

(72) Inventors: Eric Robert Burlee, Saratoga Springs, NY (US); Ronald Lee Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 14/488,813

(22) Filed: Sep. 17, 2014

(65) Prior Publication Data

US 2016/0076375 A1    Mar. 17, 2016

(51) Int. Cl.
| | |
|---|---|
| *F01D 5/00* | (2006.01) |
| *H05B 6/10* | (2006.01) |
| *H05B 6/40* | (2006.01) |
| *B23P 6/00* | (2006.01) |
| *C21D 1/42* | (2006.01) |

(Continued)

(52) U.S. Cl.
CPC .............. *F01D 5/005* (2013.01); *B23K 13/01* (2013.01); *B23P 6/007* (2013.01); *H05B 6/101* (2013.01); *H05B 6/365* (2013.01); *H05B 6/40* (2013.01); *H05B 6/44* (2013.01); *B23K 2201/001* (2013.01); *C21D 1/42* (2013.01); *F05D 2230/232* (2013.01); *F05D 2230/40* (2013.01); *F05D 2230/80* (2013.01); *Y10T 29/49318* (2015.01)

(58) Field of Classification Search
CPC ...... B23K 13/01; B23K 13/06; B23K 31/003; B23K 37/04; B23K 37/0426; B23K 37/0452; B23K 2201/001; B23P 6/002; B23P 6/007; F05D 2230/40; F05D 2230/80; F05D 2230/232; H05B 6/02; H05B 6/06; H05B 6/08; H05B 6/10; H05B 6/101; H05B 6/36; H05B 6/365; H05B 6/38; H05B 6/40; H05B 6/44; H05B 2206/022; Y10T 29/49318; Y10T 29/49737; Y10T 29/49742

See application file for complete search history.

(56) References Cited

U.S. PATENT DOCUMENTS

| | | |
|---|---|---|
| 4,832,252 A | 5/1989 | Fraser |
| 6,124,568 A | 9/2000 | Broderick et al. |

(Continued)

OTHER PUBLICATIONS

Definition of "Under", Merriam-Webster, accessed Mar. 6, 2017, https://www.merriam-webster.com/dictionary/under.*

(Continued)

*Primary Examiner* — Christopher Besler
*Assistant Examiner* — Matthew P Travers
(74) *Attorney, Agent, or Firm* — James W. Pemrick; Ernest G. Cusick; Frank A. Landgraff

(57) ABSTRACT

A system and method for repairing a blade are provided. The system includes an induction heating coil configured for heating a platform and slash face of the blade. The induction heating coil extends under the platform and is adjacent to the slash face to provide substantially uniform localized heating to both the platform and slash face of the blade. The induction heating coil is configured so that the platform is visible during a repair or welding operation.

12 Claims, 7 Drawing Sheets

(51) Int. Cl.
*B23K 13/01* (2006.01)
*H05B 6/36* (2006.01)
*H05B 6/44* (2006.01)
*B23K 101/00* (2006.01)

(56) References Cited

U.S. PATENT DOCUMENTS

| | | |
|---|---|---|
| 6,297,474 B1 | 10/2001 | Kelly et al. |
| 6,677,560 B2 | 1/2004 | Eberhardt et al. |
| 6,912,446 B2 | 6/2005 | Wang et al. |
| 7,875,135 B2 | 1/2011 | Kelly et al. |
| 2007/0194010 A1 | 8/2007 | Lovens et al. |
| 2009/0313822 A1 | 12/2009 | Lee et al. |
| 2010/0181298 A1 | 7/2010 | Gindorf et al. |
| 2013/0115060 A1 | 5/2013 | Walunj et al. |
| 2013/0143068 A1 | 6/2013 | Richter et al. |
| 2014/0101938 A1* | 4/2014 | Huxol .................. B23H 9/001 29/889 |

OTHER PUBLICATIONS

European Search Report and Opinion issued in connection with corresponding EP Application No. 15184692.0 on Feb. 10, 2016.

* cited by examiner

SYSTEM AND METHOD FOR REPAIRING BLADES

BACKGROUND OF THE INVENTION

The system and method described herein relates generally to blade repair. More specifically, the system and method relate to an induction heating coil configured to provide uniform localized heating to the platform slash face area of the blade while maintaining visibility during a welding operation.

A gas turbine engine draws in and compresses air with an axial flow compressor, mixes the compressed air with fuel, burns the mixture, and expels the combustion product through an axial flow turbine section that powers the compressor. The turbine section of the engine includes one or more disks, each disk including a plurality of blades projecting from its periphery. The hot exhaust gases strike the blades causing the disk(s) to rotate. The rotating disk(s) are attached to a shaft that also drives the compressor. The compressor is also made from rotating disks, each disk having a plurality of blades projecting from its periphery. The disk turns rapidly on a shaft as the shaft is rotated by the turbine, and the curved blades draw in and compress air in somewhat the same manner as an electric fan.

The turbine blades on the disk are in the hot exhaust gases resulting from the combustion of the fuel and rotate at very high speeds. Thus the blades operate in an oxidative and corrosive environment, and are subjected to high operating stresses. In order to survive these harsh conditions, the turbine blades are made from superalloys, an expensive blend of elements that provide oxidation resistance, corrosion resistance and strength. These superalloys are further strengthened in preferred directions by various mechanisms which include growing the turbine blades as directional grains or even as single crystals.

The superalloys used for turbine blades include nickel-based superalloys, iron-based superalloys and cobalt-based superalloys. These superalloys can be further strengthened by precipitation mechanisms. For example, gamma prime ($\gamma'$) phases comprising $Ni_3Al$ are precipitated in the gamma matrix of the FCC crystal structure of the alloy by appropriate solutioning and aging treatments. Controlling the gamma prime phases, both the size and distribution for these as-cast, new parts is well-known. The turbine blade comprises an airfoil portion that extends into a hot gas stream, a dovetail portion that attaches the blade to the turbine disk and a platform portion that separates the airfoil portion from the dovetail portion. A shank portion is intermediate the platform portion and the dovetail portion. The turbine blades are also provided with environmental coatings and/or thermal barrier coatings to further improve their survivability in the hot, corrosive, oxidative environment of a turbine engine.

The turbine blades nevertheless are subject to damage as a result of operation in the gas turbine engine. This damage can be both mechanical in nature as well as metallurgical in nature. The turbine blades are expensive to produce, so that it is desirable from an economic standpoint to repair the blades rather than replace them whenever possible. In many situations, the blades can be repaired by removing any remaining protective coatings, followed by welding damaged mechanical areas and reworking the weld repaired areas to restore the dimensions as required, followed by reapplication of the protective coatings.

Induction heating and welding has been used to repair blades, but this method is unsatisfactory when attempting to repair the platform and slash face areas of turbine blades. Previously known induction heating coils do not provide a uniform local temperature profile in the platform and slash face regions. Non-uniform temperatures experienced by the platform and slash face regions may cause the repairs to crack and fail. In addition, the previously known induction coils obstructed the view of the welding technician during welding. Poor weld quality can result when the welding technician cannot see the entire area that needs repair, because the weld may not be properly placed or applied in the proper amount or thickness.

What is needed is a system and method that permits a uniform local temperature profile in the platform and slash face regions during weld repair of super-alloy turbine blades, while maintaining visibility of the weld area for the welding technician.

BRIEF DESCRIPTION OF THE INVENTION

In an aspect of the present invention, a system for repairing a blade includes an induction heating coil configured for heating a platform and slash face of the blade. The induction heating coil extends under the platform and is adjacent to the slash face to provide substantially uniform localized heating to both the platform and slash face of the blade. The induction heating coil is configured so that the platform is visible during a welding or repair operation.

In another aspect of the present invention, a method for repairing a blade includes the steps of providing a blade having an airfoil, a platform and a slash face, and providing a fixture for supporting the blade. The fixture includes an induction heating coil configured for heating the platform and slash face of the blade. The induction heating coil extends under the platform and is adjacent to the slash face to provide substantially uniform localized heating to both the platform and slash face of the blade. The induction heating coil is configured so that the platform is visible during a welding operation. The method also includes the steps of heating the platform and slash face in an inert atmosphere, and welding a damaged region of the platform or slash face in the inert atmosphere.

In yet another aspect of the present invention, a method for repairing a blade is provided. The blade has an airfoil, a platform and a slash face. The method includes the step of providing a fixture for supporting the blade. The fixture includes an induction heating coil configured for heating the platform and slash face of the blade. The induction heating coil extends under the platform and is adjacent to the slash face to provide substantially uniform localized heating to both the platform and slash face of the blade. The induction heating coil is configured so that the platform is visible during a repair operation. The method also includes the steps of heating the platform and the slash face, and repairing a damaged region of the platform or slash face.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features. The terms "nozzle", "bucket" and "blade" will be used interchangeably, and the present invention may be applied to any turbomachine nozzle, bucket or blade, such as in a compressor or a gas or steam turbine.

Figure 1:
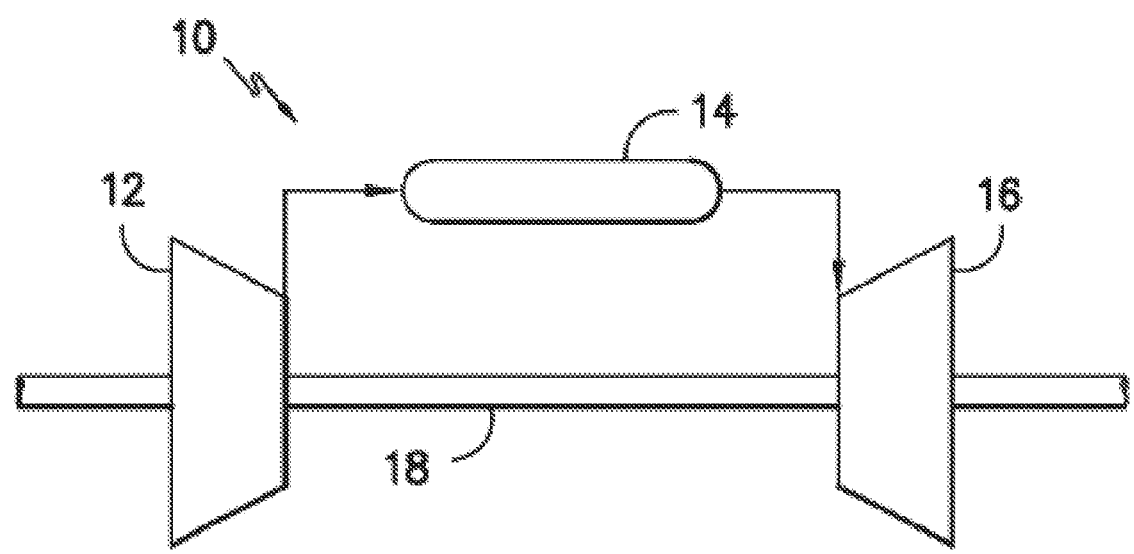
FIG. 1 is a schematic illustration of a gas turbine system according to one embodiment of the present disclosure.

FIG. 1 is a schematic diagram of a gas turbine system 10. The system 10 may include a compressor 12, a combustor 14, and a turbine 16. The compressor 12 and turbine 16 may be coupled by a shaft 18. The shaft 18 may be a single shaft or a plurality of shaft segments coupled together to form shaft 18. The turbine 16 may include a plurality of turbine stages. For example, in one embodiment, the turbine 16 may have three stages. A first stage of the turbine 16 may include a plurality of circumferentially spaced nozzles and buckets. The nozzles may be disposed and fixed circumferentially about the shaft 18. The buckets may be disposed circumferentially about the shaft and coupled to the shaft 18. A second stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. A third stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. The various stages of the turbine 16 may be at least partially disposed in the turbine 16 in, and may at least partially define, a hot gas path (not shown). It should be understood that the turbine 16 is not limited to three stages, but rather that any number of stages are within the scope and spirit of the present disclosure. Similarly, the compressor 12 may include a plurality of compressor stages (not shown). Each of the compressor 12 stages may include a plurality of circumferentially spaced nozzles and buckets.

Figure 2:
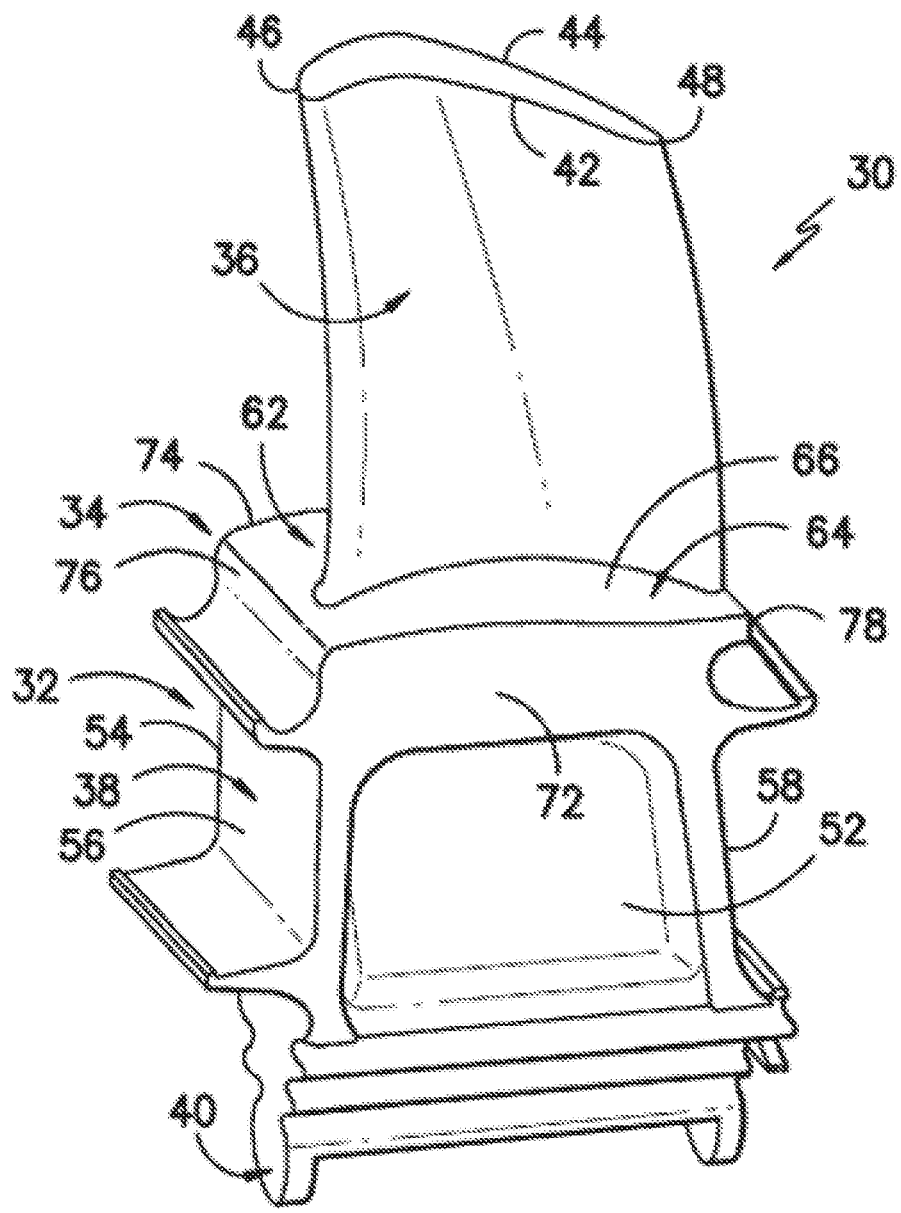
FIG. 2 illustrates a perspective view of a blade according to one embodiment of the present disclosure.

FIG. 2 illustrates a perspective view of a blade according to one embodiment of the present disclosure. One or more of the blades in the turbine 16 and/or the compressor 12 may comprise a blade 30. The blade 30 may include a main body 32 and a platform 34. The main body 32 typically includes an airfoil 36 and a shank 38. The airfoil 36 may be positioned radially outward from the shank 38. The shank 38 may include a root 40, which may attach to a rotor wheel (not shown) in the turbine system 10 to facilitate rotation of the blade 30.

In general, the main body 32 has an exterior surface. In embodiments wherein the main body 32 includes an airfoil 36 and shank 38, for example, the portion of the exterior surface defining the airfoil 36 may have a generally aerodynamic contour. For example, the airfoil 36 may have an exterior surface defining a pressure side 42 and suction side 44 each extending between a leading edge 46 and a trailing edge 48. Further, the portion of the exterior surface of the shank 38 may include a pressure side face 52, a suction side face 54, a leading edge face 56, and a trailing edge face 58.

The platform 34 may generally surround the main body 32, as shown. A typical platform may be positioned at an intersection or transition between the airfoil 36 and shank 38 of the main body 32, and extend outwardly in the generally axial and tangential directions. It should be understood, however, that a platform according to the present disclosure may have any suitable position relative to the main body 32 of the blade 30.

A platform 34 according to the present disclosure may include a forward portion 62 and an aft portion 64. The forward portion 62 is that portion of the platform 34 positioned proximate the leading edge 46 of the airfoil 36 and the leading edge face 56 of the shank 38, while the aft portion 64 is that portion of the platform 34 positioned proximate the trailing edge 48 of the airfoil 36 and the trailing edge 58 of the shank 36. The forward portion 62 and the aft portion 64 may further define a top face 66 of the platform 34, which may generally surround the airfoil 36 as shown. Further, a peripheral edge may surround the forward portion 62, aft portion 64, and top face 66. The peripheral edge may include a pressure side slash face 72 and suction side slash face 74, which each of the forward portion 62 and the aft portion 64 may extend between. The peripheral edge may further include a forward face 76, which may define a peripheral edge of the forward portion 62, and an aft face 78, which may define a peripheral edge of the aft portion 64.

Figure 3:
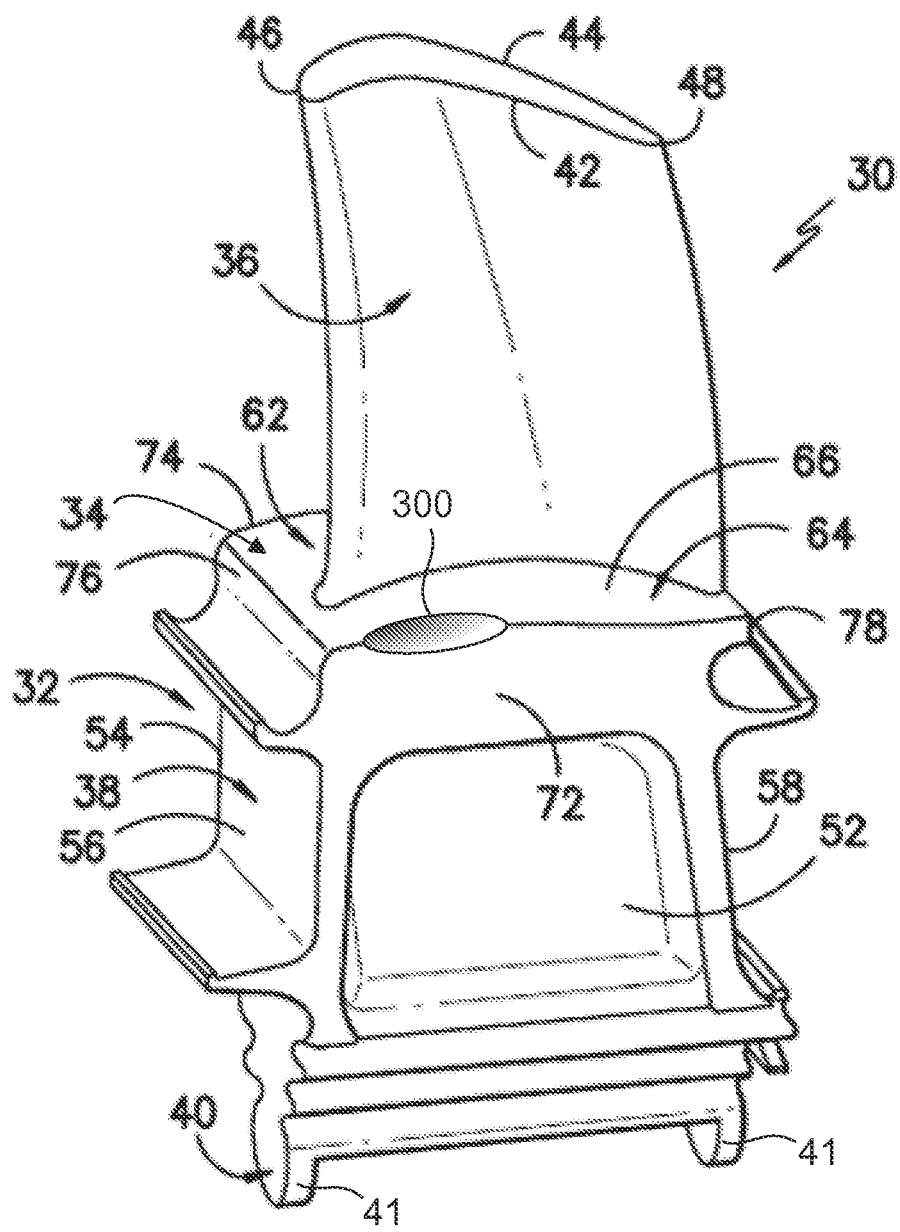
FIG. 3 illustrates a perspective view of a blade having a damaged region according to one embodiment of the present disclosure.

FIG. 3 illustrates a perspective view of a blade having a damaged region 300, according to one embodiment of the present disclosure. The damaged region 300 may be caused by erosion during operation of the turbine, or any other undesired event. The damaged region 300 spans over a portion of the aft platform 64 and the pressure side slash face 72. However, this damaged region could occur anywhere along the platform and slash face, or on other portions of the blade as well. As can be seen, a portion of the platform 34 and slash face 72 are missing. This concavity (or damaged region 300) will need repair. Welding new material to build the surface back up is a preferred method. However, as mentioned previously, known induction coils obstruct the view of the slash face and platform during welding. This obstructed view results in poor weld quality, because the welding technician cannot see the relevant portions of the platform and slash face.

Figure 4:
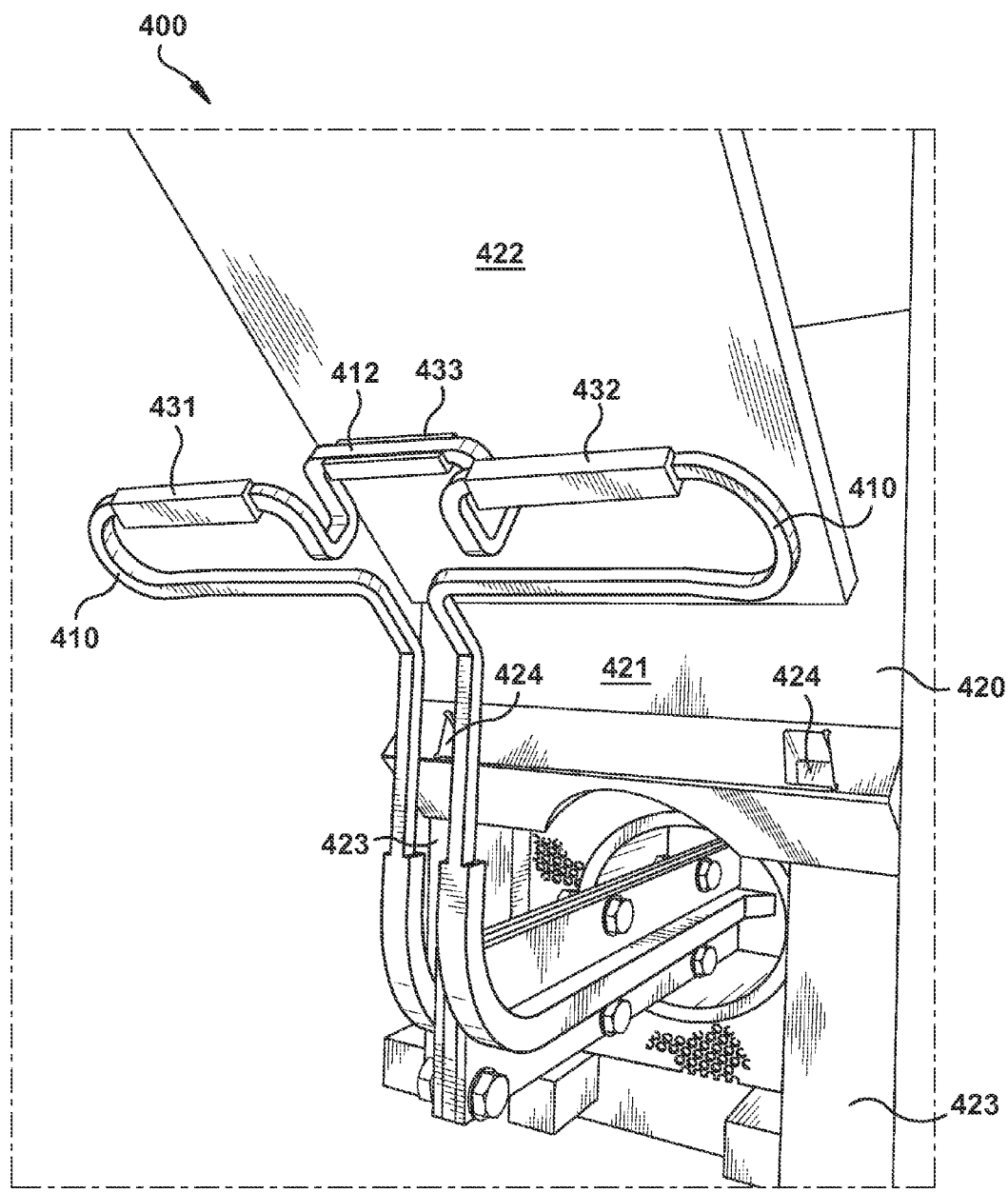
FIG. 4 illustrates a perspective view of a system for repairing blades, according to one embodiment of the present disclosure.

FIG. 4 illustrates a perspective view of a system 400, according to one embodiment of the present disclosure. The system 400 includes an induction heating coil 410 that is configured for heating the platform 64 and slash face 72 area of a blade. The induction heating coil may be mounted on a fixture 420 having a back portion 422 and root apertures 424. In use, the blade 30 is supported by the blade root tabs 41 resting in apertures 424, the slash face is "hooked over" a portion 412 of the induction heating coil 410, and the airfoil 36 may rest against the back portion 422. As will be illustrated hereinafter, the induction heating coil 410, 412 extends under the platform 64 and is adjacent to the slash face 72 to provide substantially uniform localized heating to both the platform and slash face of the blade. This configuration of the induction heating coil 410 allows the platform 64 to be visible during a welding operation. The three (or four) points of contact (i.e., apertures 424, portion 412 and back 422) make the blade 30 stable during a welding operation. A stable blade and a visible repair area, results in a better repair during a welding operation.

The fixture 420 may include a base section 421 that is slidably mounted to a pair of rails 423. This configuration allows the base section 421 and back portion 422 to be moved to accommodate blades of different sizes. For example, for a smaller blade, the base section 421 and back 422 may be slid downward (or closer to coil 410), and conversely for a larger blade, the base section 421 and back 422 may be slid upward (or farther away from coil 410). The back portion 422 may also be configured to have multiple angular positions to further accommodate multiple blade sizes. For example, the back portion 422 may have a support connected to base section 421 that has an adjustable length or pivots to multiple angles, thereby enabling the back portion to lock into multiple angular positions or tilts.

The induction heating coil 410 may also include a plurality of flux concentrators 431, 432, 433 that are configured to focus magnetic flux from the induction heating coil 410 into the blade. The flux concentrators 431 and 432 may be generally C-shaped, located on the portion of the coil 410 that is adjacent to the slash face 72, and oriented so that the open end faces the slash face 72. This configuration focuses the magnetic flux into the slash face 72 of blade 30. The flux concentrator 433 may be generally C-shaped, and located on coil portion 412 that extends under platform 64. Flux concentrator 433 is oriented so that the open end is pointed up at platform 64 to focus the magnetic flux into the platform 64.

Figure 5:
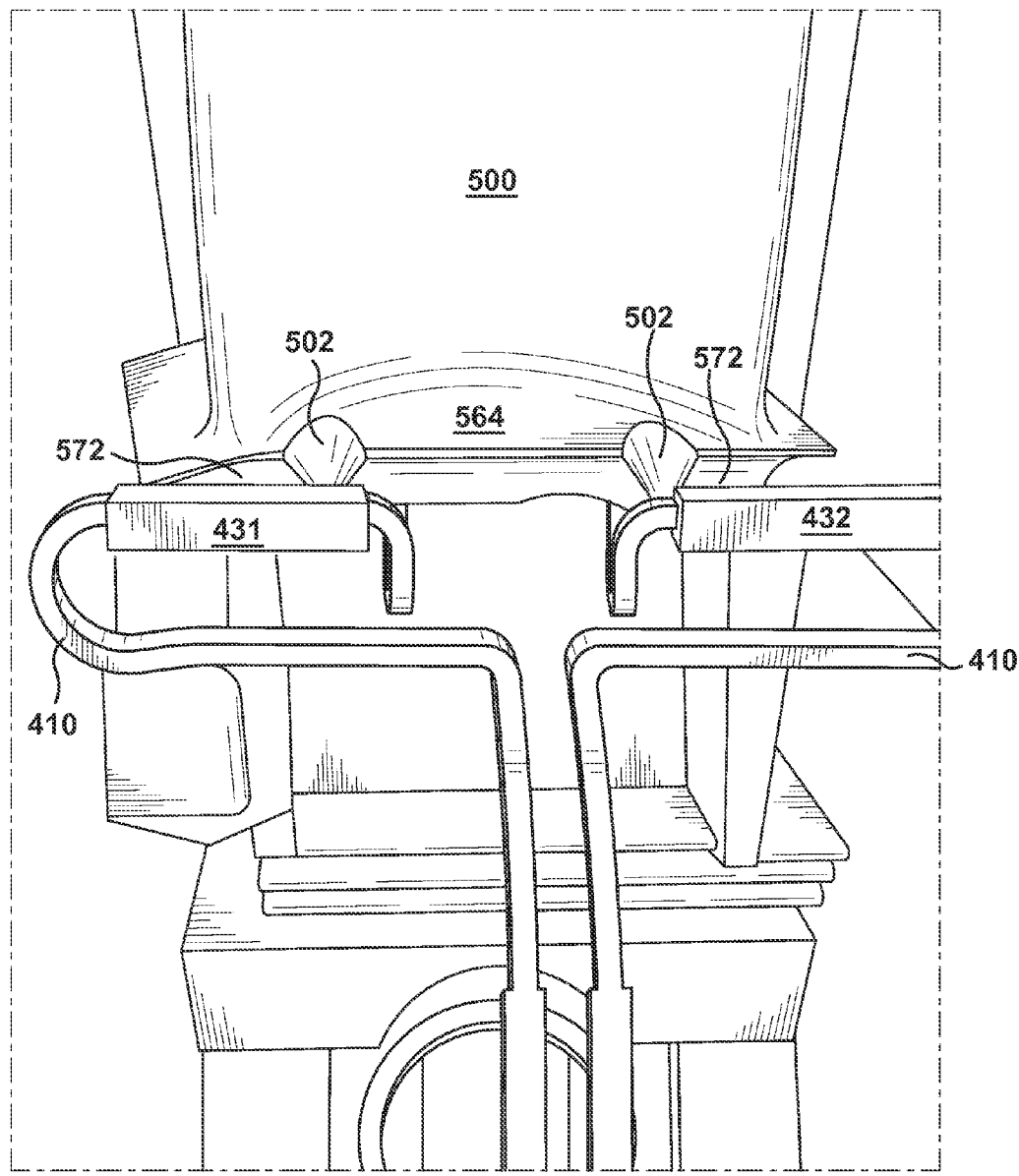
FIG. 5 illustrates a perspective view of a blade mounted on the fixture and induction heating coil, according to an embodiment of the present disclosure.

FIG. 5 illustrates a perspective view of a blade mounted on the fixture and induction heating coil, according to an embodiment of the present disclosure. The blade 500 has two damaged regions 502, and is resting on fixture 400 as well as on the portion 412 of the induction heating coil 410 that extends under the blade platform 564. As can be seen, the platform 564, slash face 572 and the damaged regions 502 are visible and accessible to a repair technician. The flux concentrators 431, 432 and 433 are configured to focus the magnetic flux into specific regions of the blade 500 to obtain a uniform local temperature profile to both the platform and slash face areas undergoing repair. As one example only, the flux concentrators 431 and 432 are both generally C-shaped and the open end of the C is facing the slash face 572. The flux concentrator 431 is located near a leading edge of blade 500 and flux concentrator is located near a trailing edge of the blade. Depending on the desired temperature profiles, the flux concentrators 431 and 432 may be located at the bottom edge of the slash face 572, at the middle (or 50% of the height) of the slash face, at the top of the slash face 572 or at any other desired location depending on the specific repair and blade geometry. The flux concentrator 433 (not shown in FIG. 5) is not visible because it is under the platform 564. The flux concentrator 433 may also be generally C-shaped and the open end of the C is facing upwards or into the bottom of the platform 564.

Figure 6:
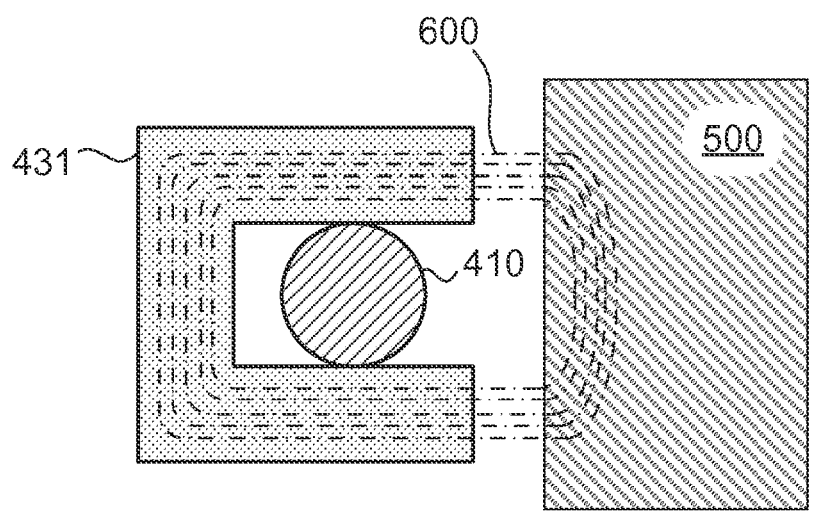
FIG. 6 illustrates a cross-sectional view of a blade, the induction heating coil and the flux concentrator, and the magnetic flux pattern during heating, according to an embodiment of the present disclosure.

FIG. 6 illustrates a cross-sectional view of a blade, the induction heating coil and the flux concentrator, and the magnetic flux pattern during heating, according to an embodiment of the present disclosure. In FIG. 6, the magnetic flux is focused on concentrated in a specific region of the blade 500. This region may be the slash face or platform, or any other desired portion of the blade. The dense magnetic flux pattern 600 allows for the use of lower power levels while still maintaining the desired eddy current in the target portion of blade 500. A benefit to this approach is that other portions of the blade can experience less heating, especially if they are not near the target repair area. In the past, the complex geometry of the blade had made it difficult to obtain a uniform local temperature profile during heating, and this resulted in some areas of the blade becoming too hot and others not hot enough for the desired weld repair. The configuration shown in FIG. 6 solves these problems by allowing a controlled and targeted method and system for heating specific portions of the blade 500.

Figure 7:
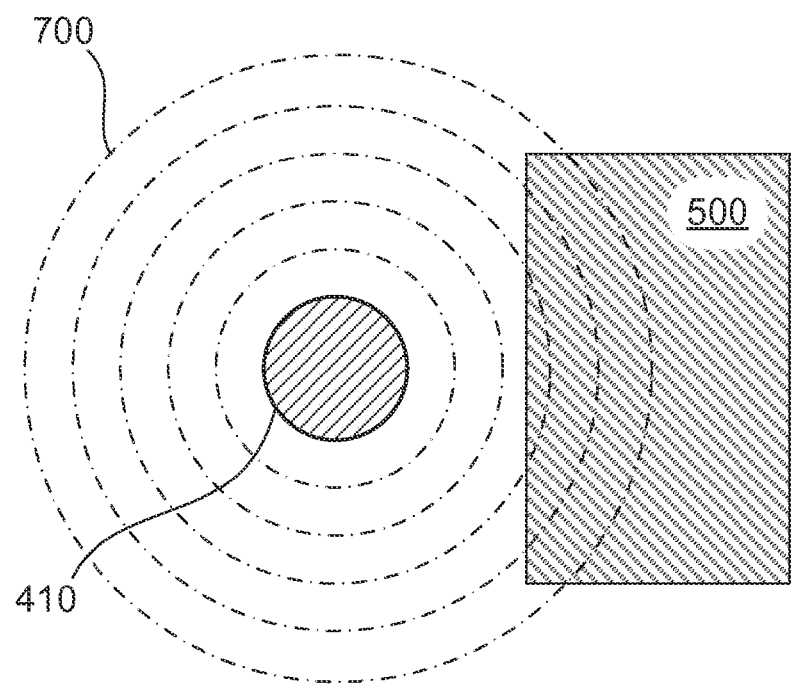
FIG. 7 illustrates a cross-sectional view of a blade, the induction heating coil and the magnetic flux pattern during heating.

FIG. 7 illustrates a cross-sectional view of a blade, the induction heating coil and the magnetic flux pattern during heating. FIG. 7 employs no flux concentrator and it can be seen that the magnetic flux 700 is uniform about the heating coil 410. However, the magnetic flux, and the resulting eddy current, is widely dispersed in blade 500. This results in specific areas being heated insufficiently while neighboring areas may be heated excessively. Greater power is required to obtain high temperatures in specific areas, but the geometry of blade 500 results in non-uniform temperature profiles. Another result of the widely dispersed magnetic flux lines is that poor weld quality may result from the non-uniform heating of the blade area undergoing repair.

Figure 8:
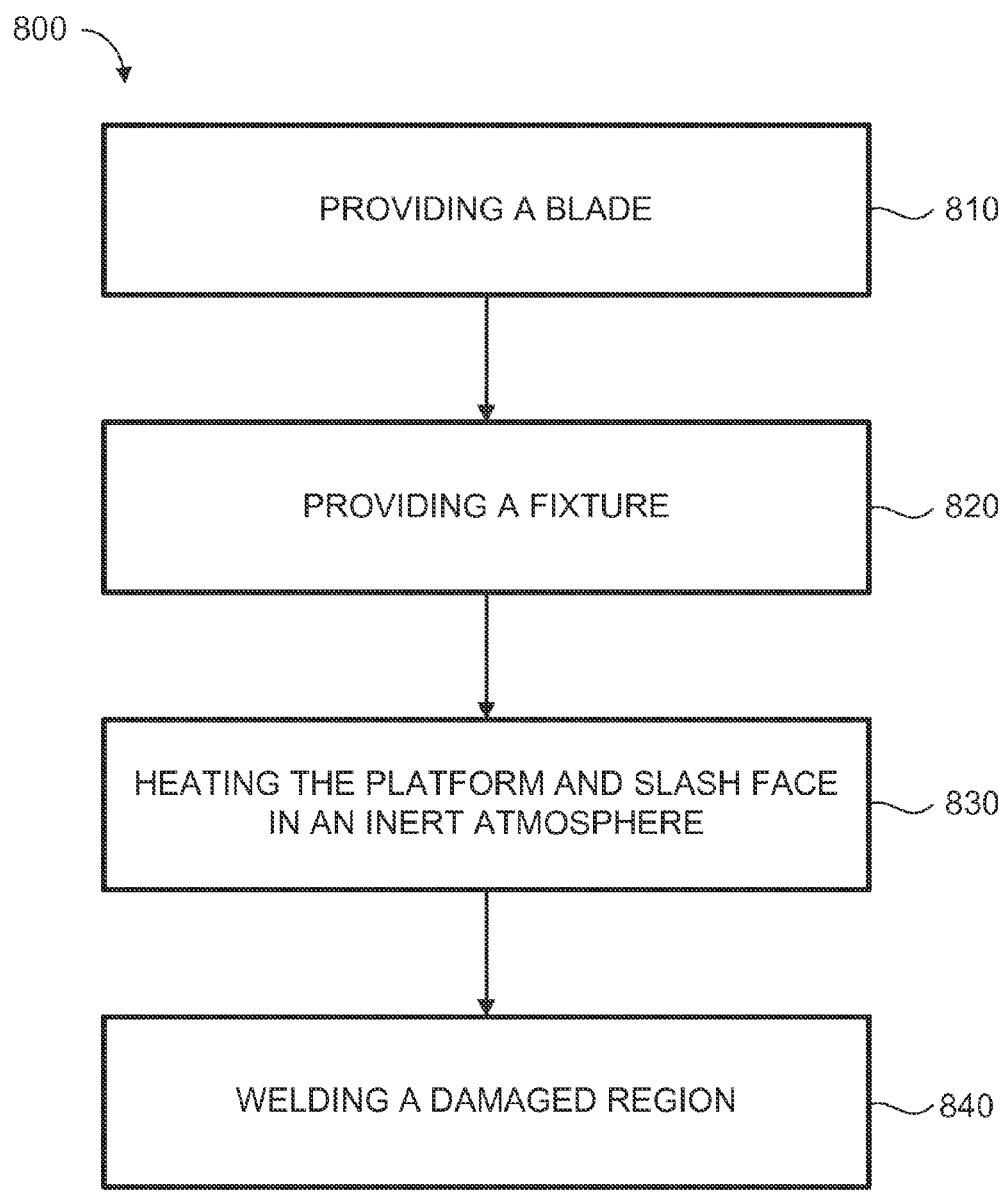
FIG. 8 illustrates a flowchart for a method for repairing a blade, according to an embodiment of the present disclosure.

FIG. 8 illustrates a flowchart for a method for repairing a blade, according to an embodiment of the present disclosure. The method 800 for repairing (or welding) a blade may include the step 810 of providing a blade having an airfoil, a platform and a slash face. Step 820 provides a fixture 400 for supporting the blade 500. The fixture 400 includes an induction heating coil 410 configured for heating the platform and slash face of the blade. The induction heating coil 410 extends under the platform and is adjacent to the slash face to provide substantially uniform localized heating to both the platform and slash face of the blade. The induction heating coil is configured so that the platform is visible during a welding operation. A heating step 830 heats the platform and slash face in an inert atmosphere. The heating step may include heating the platform and slash face to between about 1,650° F. and about 1,750° F. A welding step 840 welds a damaged region of the platform or slash face in the inert atmosphere. The heating step 830 may be performed prior to the welding step 840 and during the welding step 840.

The induction heating coil may also include a plurality of flux concentrators, where the flux concentrators are configured to focus a magnetic flux from the induction heating coil into the blade. For example, a first flux concentrator is located on a portion of the induction heating coil that extends under the platform, and is configured to focus the magnetic flux into the platform. A second flux concentrator and a third flux concentrator are located on a portion of the induction heating coil that is adjacent to the slash face, and are both configured to focus the magnetic flux into the slash face. The second flux concentrator may be located near a leading edge of the blade and the third flux concentrator may be located near a trailing edge of the blade. The second and third flux concentrators may be located at about 50% of a height of the slash face.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for repairing a blade, the method comprising:
   providing a blade having an airfoil, a platform and a slash face;
   providing a fixture for supporting the blade, the fixture further comprising,
      an induction heating coil configured for heating the platform and slash face of the blade, wherein the induction heating coil extends under the platform and is adjacent to the slash face to provide substantially uniform localized heating to both the platform and slash face of the blade, and wherein the induction heating coil is configured so that the platform is visible during a welding operation, a plurality of flux concentrators, the flux concentrators configured to focus a magnetic flux from the induction heating coil into the blade, and a first flux concentrator is located on a portion of the induction heating coil that extends under the platform, and the first flux concentrator is configured to focus the magnetic flux into the platform, a second flux concentrator and a third flux concentrator are located on a portion of the induction heating coil that is adjacent to the slash face, and the second and third flux concentrators are both configured to focus the magnetic flux into the slash face;
   heating the platform and slash face in an inert atmosphere; and
   welding a damaged region of the platform or slash face in the inert atmosphere.

2. The method of claim 1, wherein the second flux concentrator is located near a leading edge of the blade and the third flux concentrator is located near a trailing edge of the blade.

3. The method of claim 1, wherein the second and third flux concentrators are located at about 50% of a height of the slash face.

4. The method of claim 1, wherein the heating step is performed prior to the welding step and during the welding step.

5. The method of claim 1, the heating step further comprising:
   heating the platform and slash face to between about 1,650° F. and about 1,750° F.

6. A method for repairing a blade, the blade having an airfoil, a platform and a slash face, the method comprising:
   providing a fixture for supporting the blade, the fixture further comprising, an induction heating coil configured for heating the platform and slash face of the blade, wherein the induction heating coil extends under the platform and is adjacent to the slash face to provide substantially uniform localized heating to both the platform and slash face of the blade, and wherein the induction heating coil is configured so that the platform is visible during a repair operation;
   heating the platform and the slash face;
   repairing a damaged region of the platform or slash face; and
   wherein the induction heating coil further comprises a plurality of flux concentrators, the flux concentrators configured to focus a magnetic flux from the induction heating coil into the blade, and wherein a first flux concentrator is located on a portion of the induction heating coil that extends under the platform, and the first flux concentrator is configured to focus the magnetic flux into the platform, a second flux concentrator and a third flux concentrator are located on a portion of the induction heating coil that is adjacent to the slash face, and the second and third flux concentrators are both configured to focus the magnetic flux into the slash face.

7. The method of claim 6, the heating step further comprising:
   heating the platform and the slash face in an inert atmosphere.

8. The method of claim 7, the repairing step further comprising:
   welding the blade in an inert atmosphere.

9. The method of claim 6, wherein the second flux concentrator is located near a leading edge of the blade and the third flux concentrator is located near a trailing edge of the blade.

10. The method of claim 9, wherein the second and third flux concentrators are located at about 50% of a height of the slash face.

11. The method of claim 6, wherein the heating step is performed prior to the welding step and during the welding step.

12. The method of claim 11, the heating step further comprising:
   heating the platform and slash face to between about 1,650° F. and about 1,750° F.

* * * * *